US012681869B2

(12) United States Patent
Sagot et al.

(10) Patent No.: US 12,681,869 B2
(45) Date of Patent: Jul. 14, 2026

(54) METHOD FOR LOCKING A REWRITABLE NON-VOLATILE MEMORY AND ELECTRONIC DEVICE IMPLEMENTING SAID METHOD

(71) Applicant: SAGEMCOM BROADBAND SAS, Rueil Malmaison (FR)

(72) Inventors: Didier Sagot, Rueil Malmaison (FR); Florent Dionisi, Rueil Malmaison (FR); Pascal Perray, Rueil Malmaison (FR); Eric Le Bihan, Rueil Malmaison (FR)

(73) Assignee: SAGEMCOM BROADBAND SAS, Bois-Colombes (FR)

( * ) Notice: Subject to any disclaimer, the term of this patent is extended or adjusted under 35 U.S.C. 154(b) by 0 days.

(21) Appl. No.: 17/969,948

(22) Filed: Oct. 20, 2022

(65) Prior Publication Data

US 2023/0129942 A1    Apr. 27, 2023

(30) Foreign Application Priority Data

Oct. 26, 2021    (FR) ...................................... 2111368

(51) Int. Cl.
*G06F 12/14*          (2006.01)

(52) U.S. Cl.
CPC .. *G06F 12/1441* (2013.01); *G06F 2212/1052* (2013.01)

(58) Field of Classification Search
CPC ......... G06F 12/1441; G06F 2212/1052; G06F 12/0638; G06F 2212/202; G06F 2212/7208; G06F 8/654; G06F 21/79; G06F 3/0632; G06F 3/0619; G06F 3/0679
See application file for complete search history.

(56) References Cited

U.S. PATENT DOCUMENTS

| | | | | | |
|---|---|---|---|---|---|
| 6,026,016 A | * | 2/2000 | Gafken | .................. | G11C 16/22 |
| | | | | | 711/E12.1 |
| 2004/0215908 A1 | * | 10/2004 | Zimmer | .............. | G06F 21/6209 |
| | | | | | 711/E12.1 |
| 2006/0259207 A1 | * | 11/2006 | Natsume | .................. | G06F 8/65 |
| | | | | | 701/1 |

(Continued)

FOREIGN PATENT DOCUMENTS

| | | |
|---|---|---|
| EP | 3 511 826 A1 | 7/2019 |
| WO | 2017/188976 A1 | 11/2017 |

OTHER PUBLICATIONS

Free On-Line Dictionary of Computing, definition of round-robin; https://foldoc.org/round-robin; Feb. 10, 1996 (Year: 1996).*

(Continued)

*Primary Examiner* — Michael Krofcheck
(74) *Attorney, Agent, or Firm* — Williams Mullen; R. Brian Drozd

(57) ABSTRACT

A method for locking a rewritable non-volatile memory of an electronic device is described. A first step of initialising the electronic device is performed. At least one memory area of the rewritable non-volatile memory is then selected from a set of N memory areas of the rewritable non-volatile memory, each of the N memory areas having a content, N being an integer $\geq 2$. The memory area selected is locked by volatile locking. A second step of initialising the electronic device is performed using a content stored in the memory area selected.

11 Claims, 7 Drawing Sheets

(56)  References Cited

U.S. PATENT DOCUMENTS

| | | | |
|---|---|---|---|
| 2014/0250290 A1* | 9/2014 | Stahl .................... | H04L 9/3247 |
| | | | 713/2 |
| 2016/0085558 A1* | 3/2016 | Anbazhagan .......... | G06F 8/654 |
| | | | 713/2 |
| 2019/0005245 A1* | 1/2019 | Laffey .................. | G06F 3/0632 |
| 2019/0212999 A1* | 7/2019 | Chen .................... | G06F 9/4406 |
| 2019/0258542 A1* | 8/2019 | Chaiken .............. | G06F 11/1068 |
| 2020/0183594 A1* | 6/2020 | Gyllenskog ........ | G11C 16/3431 |

OTHER PUBLICATIONS

Cambridge Dictionary, definition of when; https://dictionary.cambridge.org/us/dictionary/english/when (Year: 2025).*

Cambridge Dictionary, "If or when?"; https://dictionary.cambridge.org/us/grammar/british-grammar/if-or-when (Year: 2025).*

Jul. 1, 2022 Search Report issued in French Patent Application No. 2111368.

* cited by examiner

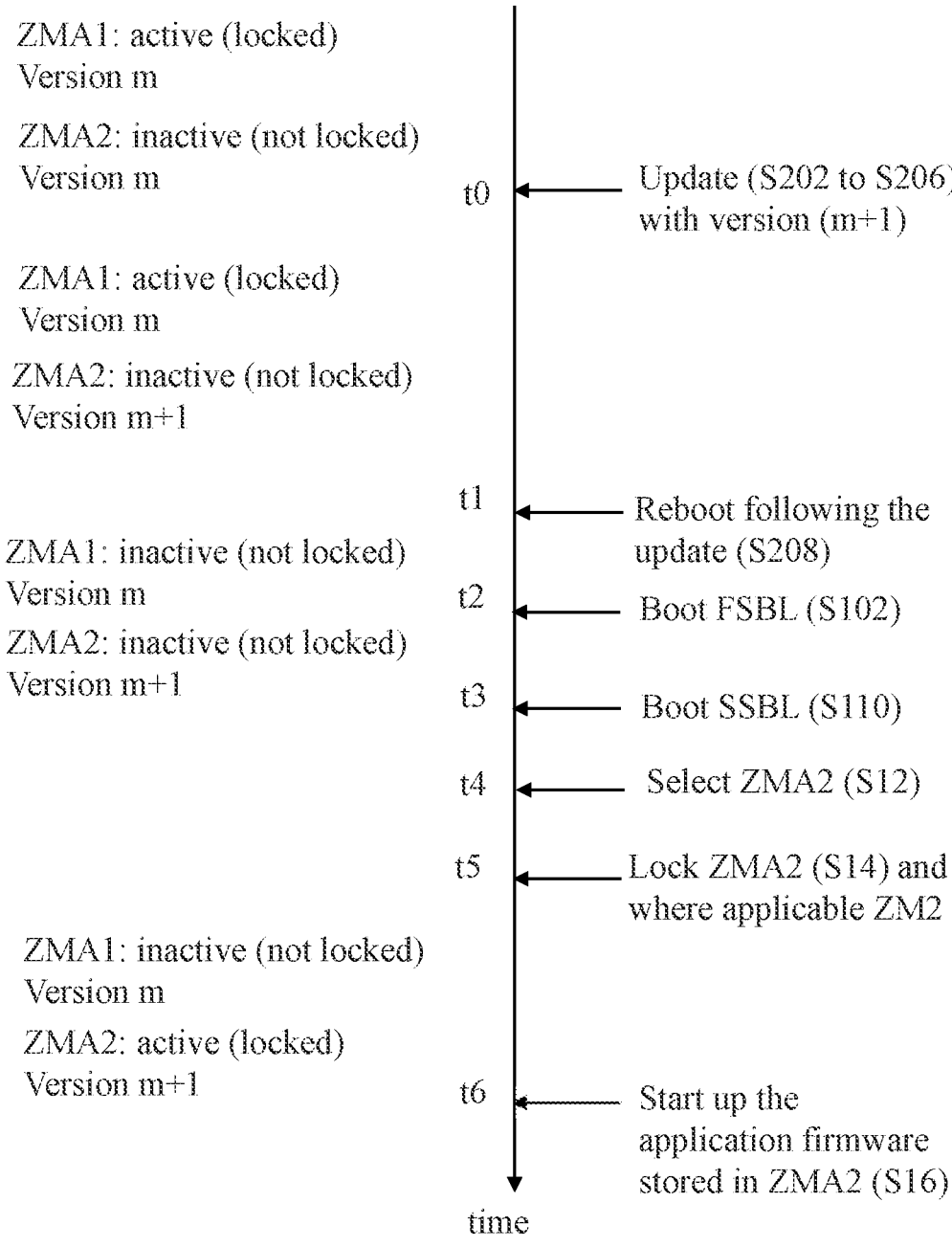

State of memory areas

ZMA1: active (locked)
Version m

ZMA2: inactive (not locked)
Version m t0 ← Update (S202 to S206) with version (m+1)

ZMA1: active (locked)
Version m

ZMA2: inactive (not locked)
Version m+1 t1 ← Reboot following the update (S208)

ZMA1: inactive (not locked)
Version m t2 ← Boot FSBL (S102)

ZMA2: inactive (not locked)
Version m+1 t3 ← Boot SSBL (S110)

t4 ← Select ZMA2 (S12)

t5 ← Lock ZMA2 (S14) and where applicable ZM2

ZMA1: inactive (not locked)
Version m

ZMA2: active (locked)
Version m+1 t6 ← Start up the application firmware stored in ZMA2 (S16)

time

FIG.7

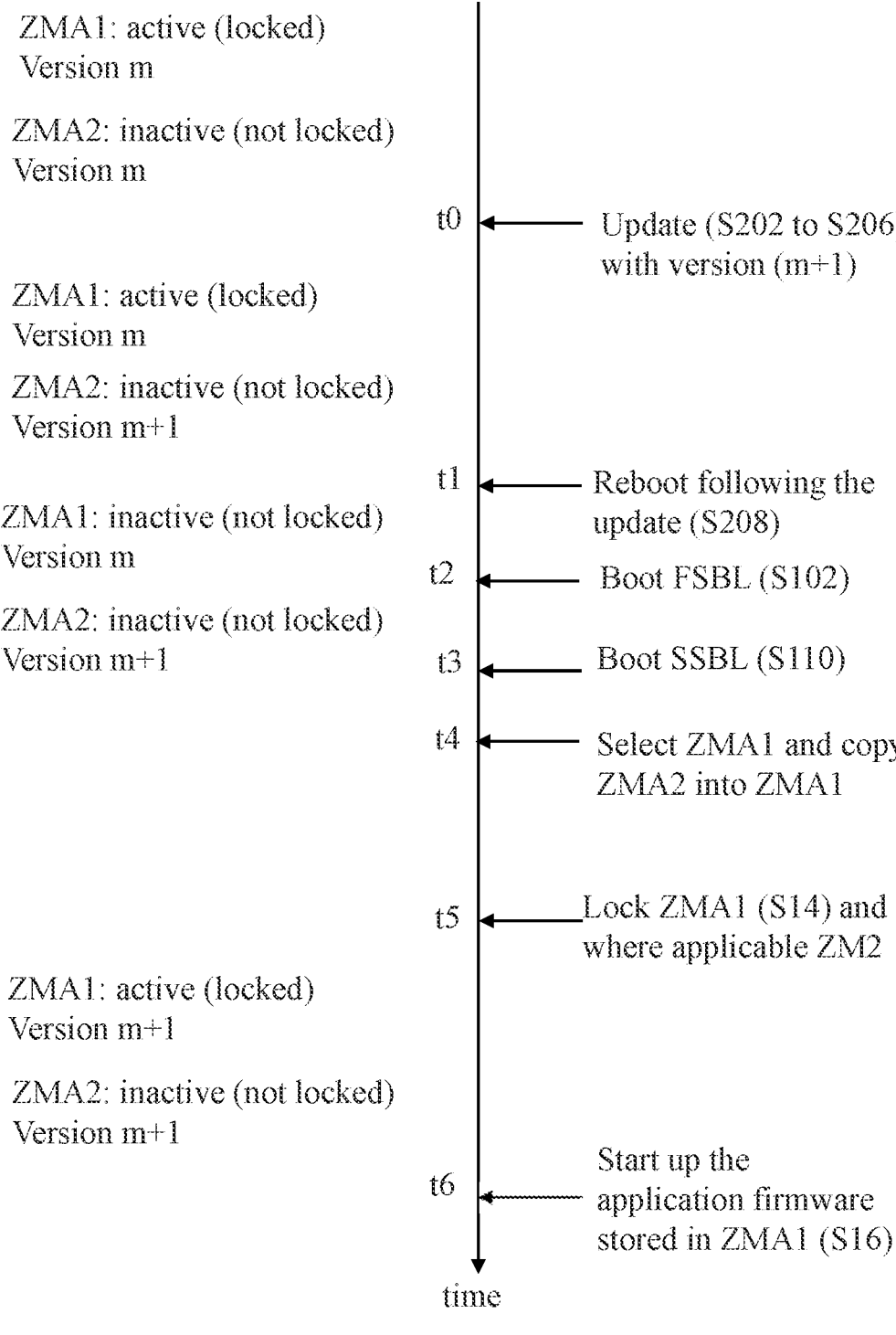

State of memory areas

ZMA1: active (locked)
Version m

ZMA2: inactive (not locked)
Version m t0 ← Update (S202 to S206)
with version (m+1)

ZMA1: active (locked)
Version m

ZMA2: inactive (not locked)
Version m+1 t1 ← Reboot following the
update (S208)

ZMA1: inactive (not locked)
Version m t2 ← Boot FSBL (S102)

ZMA2: inactive (not locked)
Version m+1 t3 ← Boot SSBL (S110)

t4 ← Select ZMA1 and copy
ZMA2 into ZMA1 t5 ← Lock ZMA1 (S14) and
where applicable ZM2

ZMA1: active (locked)
Version m+1

ZMA2: inactive (not locked)
Version m+1 t6 ← Start up the
application firmware
stored in ZMA1 (S16)

time

FIG.8

METHOD FOR LOCKING A REWRITABLE NON-VOLATILE MEMORY AND ELECTRONIC DEVICE IMPLEMENTING SAID METHOD

TECHNICAL FIELD

At least one embodiment relates to a method for locking a rewritable non-volatile memory of an electronic device. At least one other embodiment relates to an electronic device implementing said method.

PRIOR ART

A large number of electronic devices (e.g. smartphones, computers, connected objects, etc.) includes software. The software of these devices is often broken down into two parts: firstly the booting software and secondly the application software.

In recent electronic devices, storing this booting and application software in an external rewritable non-volatile memory (denoted RNVM hereinafter) is known, such as for example a EEPROM memory (electronically erasable programmable ROM). A NAND flash memory is a particular example of a EEPROM memory. Such a memory does not require an electrical supply for storing the data unlike a RAM (the English acronym for random access memory) volatile memory, e.g. a DDR memory (the English acronym for double data rate). Thus the data are not erased when the memory ceases to be supplied with electric current.

When an electronic device is started up, the booting software present on the RNVM memory is loaded into a bootloader in a random access memory of the electronic device with a view to execution thereof by a processor of said electronic device. A bootloader is specialised software the role of which is to transfer into the random access memory the booting data of the electronic device that are for example stored in the RNVM. Hereinafter, to simplify the drafting, we shall use the English term bootloader. Thus the bootloader is generally launched just after the electronic device is powered up or rebooted.

Such electronic devices are particularly sensitive to attacks such as a deletion or a reprogramming, in particular when the RNVM memory is used as a booting peripheral. In order to protect the software stored in the RNVM memory against deletion or reprogramming, write-protecting certain memory areas by means of particular mechanisms is known. For example, a single programming memory of the OTP type (the English acronym for one-time programmable) is used in certain memory areas. A memory area of the OTP type can therefore be programmed only once, which prevents any modification of the software stored in this area. Other RNVM memory areas can be protected against any modifications by means of passwords. Such protections make it possible to avoid modification by an unauthorised third party of the software stored in the RNVM memory.

Moreover, protecting the boot phase of the electronic device in order to detect any modification is also known. For this purpose, using a boot method using a trust chain is known. Such a boot method operates by steps with, at each step, a signature verification mechanism.

However, such protections (i.e. OTP, use of passwords, etc.) interfere with the software updating of the RNVM memory as well as the hardware maintenance thereof. Moreover, the software, in particular the application firmware, has a need to be updated regularly. It must therefore be able to be replaced by new versions. Modification access to the RNVM memory is therefore necessary during the updating phase. Moreover, hardware maintenance of the RNVM memory is also necessary. In the particular case of a flash memory, this maintenance uses for example a UBI (the English acronym for Unsorted Block Images) file management system. The associated maintenance mechanisms provide in particular management of the defective areas and wear levelling. However, to carry out this maintenance, the file management system used needs write access to the RNVM memory during the maintenance phases, for example to reallocate a defective memory area by rewriting in another memory area.

It is desirable to overcome the aforementioned drawbacks of the prior art. In particular, it is desirable to propose a method that protects the RNVM memory against attacks and in particular attempts at modifying or deleting the software, in particular the application firmware, while facilitating updating thereof as well as, where necessary, hardware maintenance thereof.

DISCLOSURE OF THE INVENTION

At least one embodiment relates to a method for locking a rewritable non-volatile memory of an electronic device. The method comprises:

performing a first step of initialising the electronic device;

selecting at least one memory area of said rewritable non-volatile memory from a set of N memory areas of said rewritable non-volatile memory, each of said N memory areas comprising a content, N being an integer $\geq 2$;

locking said at least one selected memory area by a volatile locking; and performing a second step of initialising the electronic device using a content stored in said at least one selected memory area.

By means of the locking of at least one memory area, the method protects the RNVM memory against attacks and in particular attempts at modifying or deleting the content while facilitating any updating of said content by means of the non-locked memory areas.

In a particular embodiment, selecting at least one memory area comprises selecting a memory area comprising the most recent version of said content.

In a particular embodiment, in the case where M memory areas comprise said most recent version of said content, M being an integer belonging to [2; N], selecting at least one memory area comprises selecting, from said M memory areas, the memory area the previous selection of which is the oldest.

In a particular embodiment, the method furthermore comprises hardware maintenance of said N memory areas before any locking of said at least one selected memory area.

In a particular embodiment, performing a first step of initialising the electronic device comprises:

authenticating, by a secure initial boot, first booting software stored in a first memory area of said rewritable non-volatile memory;

starting up said first booting software;

authenticating, by said first booting software, second booting software stored in a second memory area of said rewritable non-volatile memory different from said first area;

starting up said second booting software; and authenticating, by said second booting software, for each of said N memory areas, the content stored.

In a particular embodiment, locking said at least one selected memory area by volatile locking furthermore comprises locking said second memory area by volatile locking.

In a particular embodiment, the method furthermore comprises hardware maintenance of said second memory area before any volatile locking of said second memory area.

In a particular embodiment, said rewritable non-volatile memory area is a NAND flash memory.

In a particular embodiment, said first memory area is a one-time programming memory.

In a particular embodiment, said content is application firmware and the second step of initialising the electronic device comprises the starting up of said application firmware.

In a particular embodiment, the method furthermore comprises, after the step of performing a second step of initialising the electronic device using the content stored in said at least one selected memory area:

determining that an update is necessary;

selecting from the set of N memory areas at least one non-locked memory area;

loading a new version of the content into said at least one non-locked memory area selected;

rebooting said electronic device.

An electronic device comprising a rewritable non-volatile memory and at least one processor is also described. The electronic device is configured for:

performing a first step of initialising the electronic device;

selecting at least one memory area of said rewritable non-volatile memory from a set of N memory areas of said rewritable non-volatile memory, each of said N memory areas comprising a content, N being an integer ≥2;

locking said at least one selected memory area by a volatile locking; and performing a second step of initialising the electronic device using a content stored in said at least one selected memory area.

The electronic device is in particular configured for implementing the method according to any one of the preceding embodiments.

A computer program product is described. It comprises instructions for implementing the locking method according to any one of the preceding embodiments, when said program is executed by a processor.

A storage medium is described. It stores a computer program comprising instructions for implementing the locking method according to any one of the preceding embodiments, when said program is executed by a processor.

BRIEF DESCRIPTION OF THE DRAWINGS

The features of the invention mentioned above, as well as others, will emerge more clearly from a reading of the following description of an example embodiment, said description being made in relation to the accompanying drawings, among which:

FIG. 7 is a diagram of sequences illustrating the methods for updating the content and for locking according to a first embodiment; and FIG. 8 is a diagram of sequences illustrating the methods for updating the content and for locking according to a second embodiment.

DETAILED DISCLOSURE OF EMBODIMENTS

Figure 1:
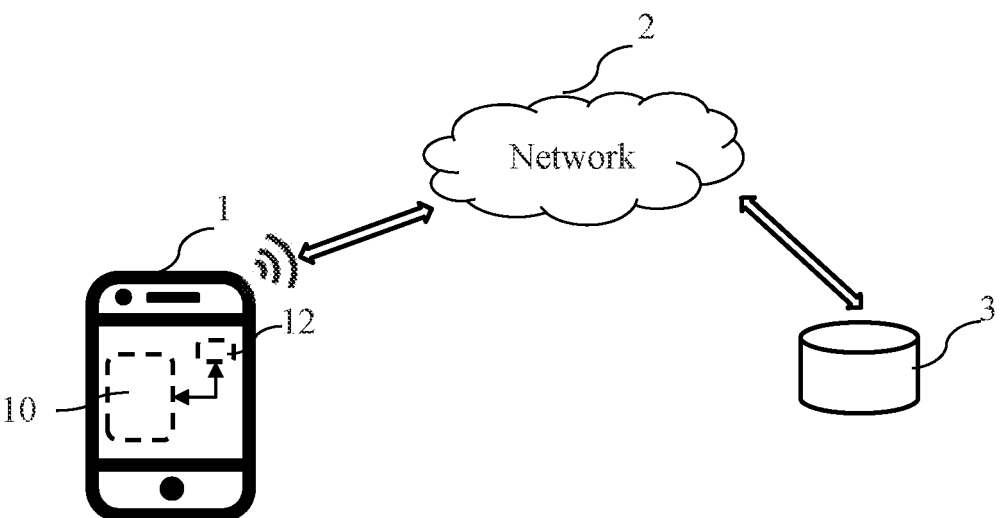
FIG. 1 illustrates schematically a hardware architecture of an electronic device according to a particular embodiment.

FIG. 1 illustrates schematically a hardware architecture of a connected electronic device 1 able to implement the invention, comprising a component 10 of a system on chip SoC type connected to a rewritable non-volatile external memory RNVM 12. On FIG. 1, the electronic device 1 is a mobile telephone. However, the electronic device may be of any other nature (e.g. computer, embedded system, connected object, etc.). The electronic device 1 is connected to a server 3 by means of a network 2. The electronic device 1 is for example a smartphone. The communication network 2 is for example a 3G, 4G or 5G network, or of the xDSL or fibre optic type.

Figure 2:
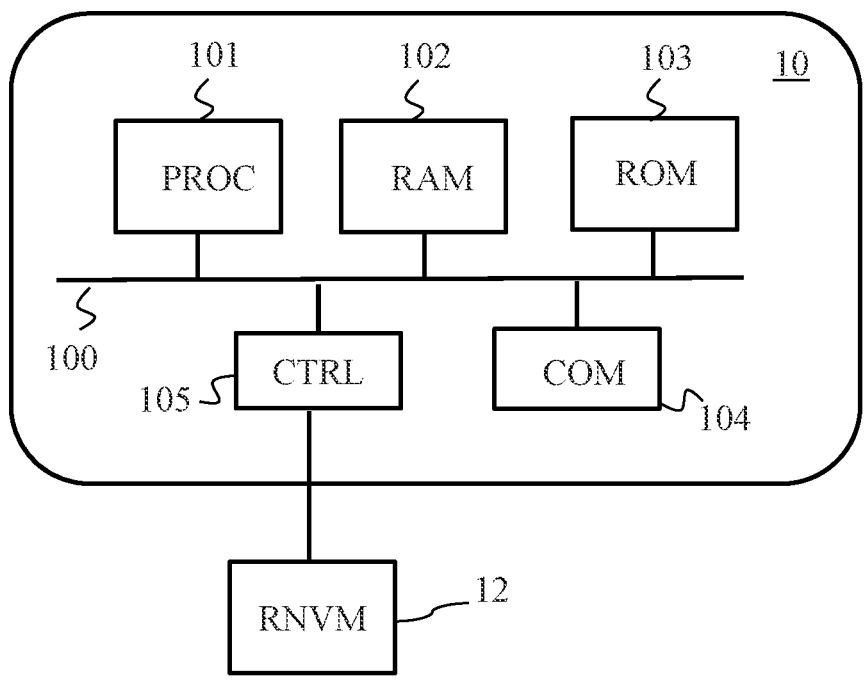
FIG. 2 illustrates schematically, according to a particular embodiment, a hardware architecture of a component of the electronic device, said component being connected to a rewritable non-volatile memory.

FIG. 2 illustrates schematically a hardware architecture of the component 10 according to a particular embodiment. The component 10 is connected to the RNVM 12 such as for example a memory based on EEPROM (the English acronym for electronically erasable programmable ROM) technology. In a particular example embodiment, the RNVM memory 12 is a NAND flash memory. In another particular example embodiment, the RNVM memory 12 is a memory of the eMMC (the English acronym for "embedded Multi-Media Card") type, the latter being able to correspond to a NAND flash memory coupled to a memory controller. In the case of an RNVM memory 12 of the eMMC type, volatile or non-permanent locking mechanisms dedicated to eMMC may also be used for certain embodiments. These mechanisms are for example based on a functionality known by the English terminology "Replay Protected Memory Block". The component 10 then comprises, connected by a communication bus 100: a processor or CPU (central processing unit) 101; a random access memory RAM 102, e.g. a DDR memory; a read only memory ROM 103; at least one communication interface 104 enabling the electronic device 1 to connect to the communication network 2 and to communicate with the server 3. The component 10 also comprises control means such as for example a controller 105 configured for controlling the exchanges of data with the RNVM 12. The component 10 may comprise other control means, not shown on FIG. 2, e.g. means for controlling the RAM and/or the ROM.

The processor 101 is capable of executing instructions loaded in the RAM 102 from the ROM 103, from the RNVM memory 12, or from a communication network. In particular, when the electronic device 1 is powered up, the processor 101 is capable of reading booting instructions from the RAM 102 and executing them. These booting instructions stored in the RNVM memory 12 are loaded into the RAM 102 by the bootloader. These instructions form a computer program causing the implementation, by the processor 101, of all or some of the methods described in relation to FIGS. 4 to 6.

Figure 4:
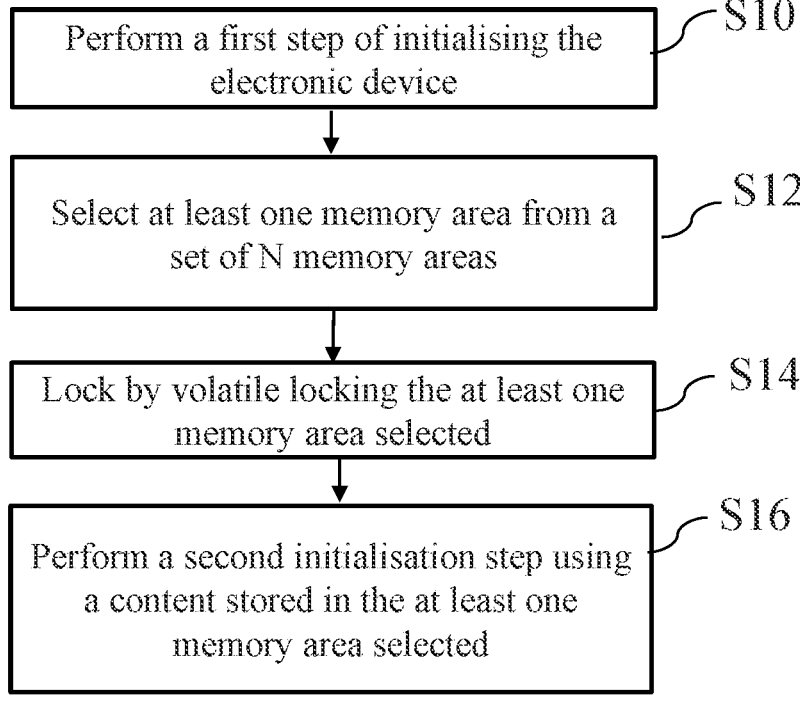
FIG. 4 illustrates a method for locking a rewritable non-volatile memory of an electronic device according to a particular embodiment.
Figure 5:
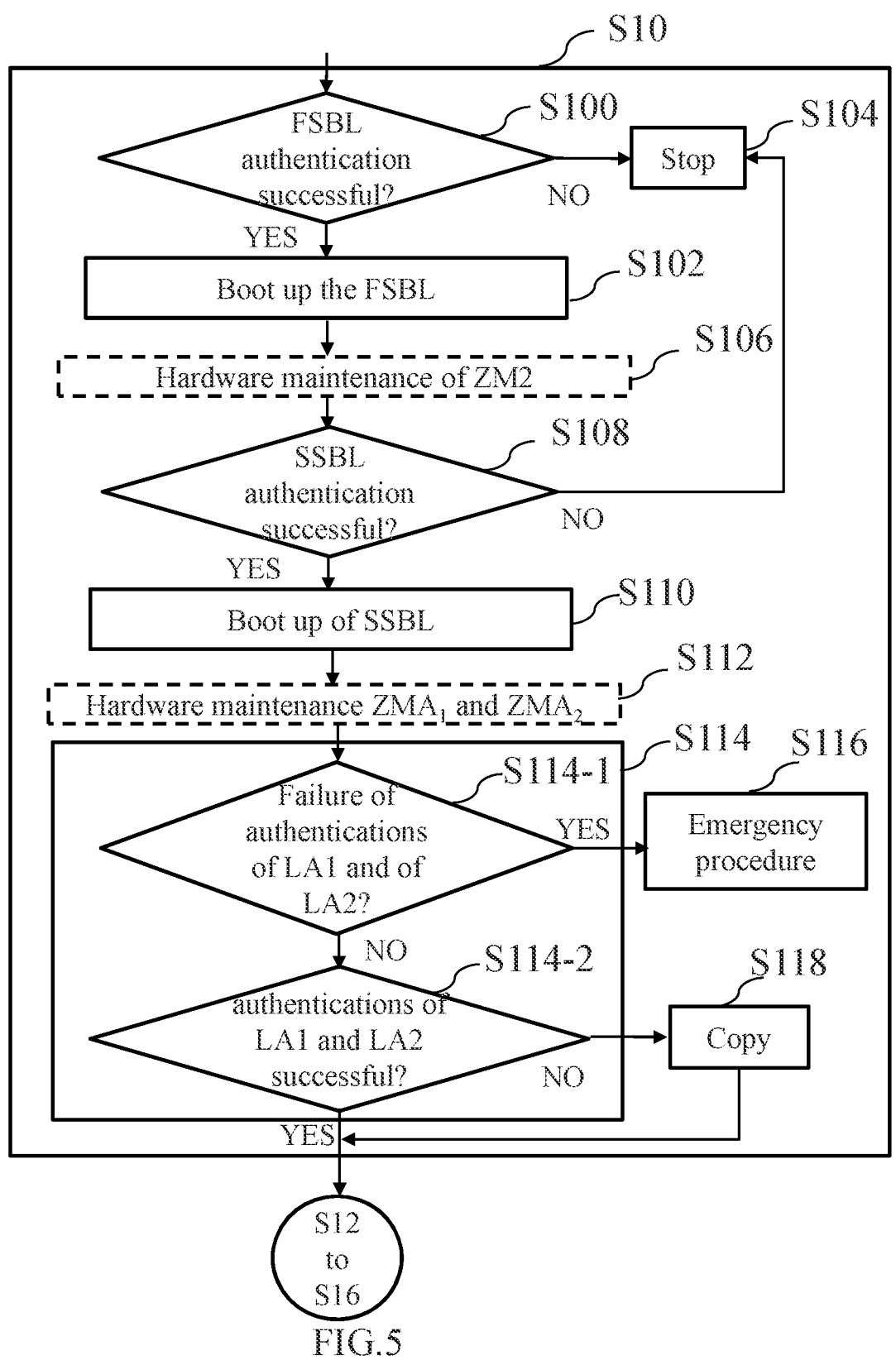
FIG. 5 illustrates in detail a step of the method for locking a rewritable non-volatile memory according to a particular embodiment.
Figure 6:
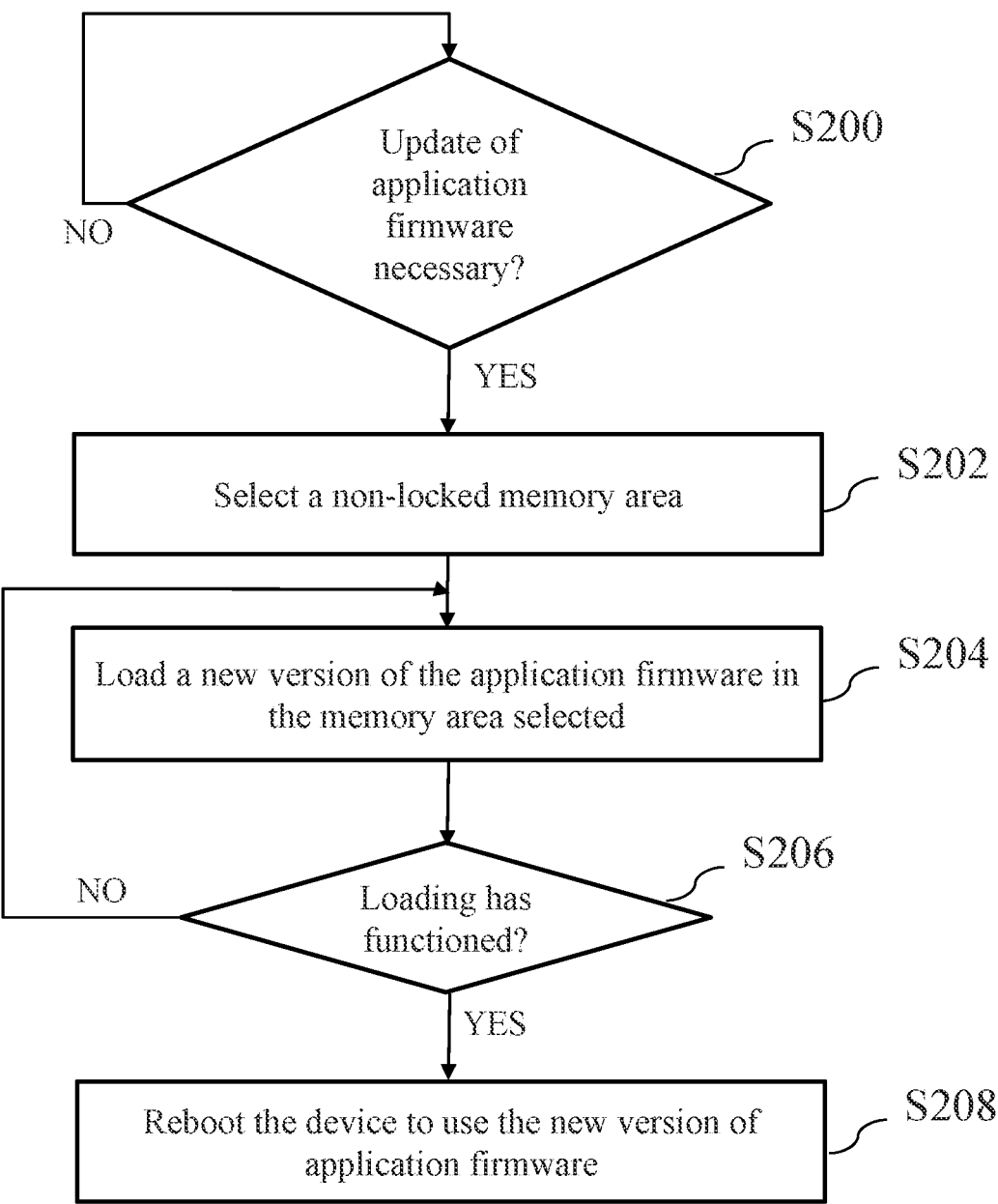
FIG. 6 illustrates a method for updating the content stored in the rewritable non-volatile memory according to a particular embodiment.

In general, the electronic device 1 comprises electronic circuitry configured for implementing the methods described in relation to FIGS. 4 to 6.

Figure 3:
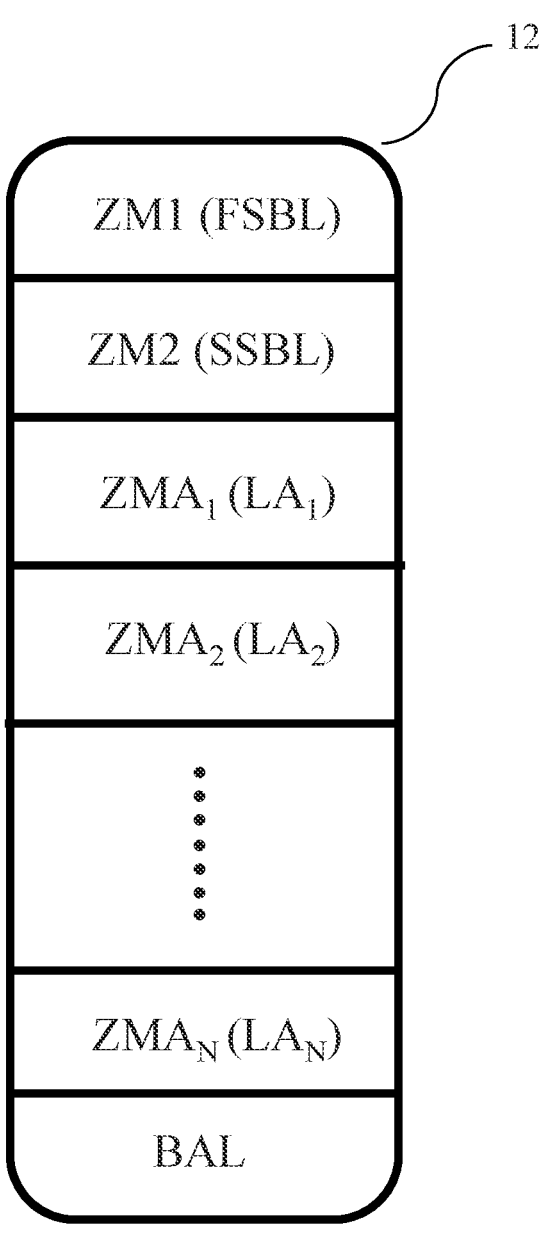
FIG. 3 illustrates schematically various areas of the rewritable non-volatile memory according to a particular embodiment.

FIG. 3 illustrates schematically various areas of the RNVM memory 12 according to a particular embodiment. This memory stores booting software as well as at least one content, e.g. application firmware. With a view to implementing booting using a trust chain, the RNVM memory 12 comprises a first memory area ZM1 in which a first FSBL (the English acronym for "First Stage BootLoader") booting software module is stored, which starts up following the booting of the electronic device 1. Generally, the FSBL is very small in size and performs minimal initialisations of the hardware part, e.g. an initialisation of the controllers of the memories. Conventionally, it does not comprise any operating system. This memory area ZM1 is advantageously a one-time programming memory area of the OTP type. The RNVM memory 12 comprises a second memory area ZM2 wherein a second SSBL (the English acronym of "Secondary Stage BootLoader") booting software module is stored. This second software module makes it possible to end initialising the electronic device 1 and manages all or part of the updating of the content such as the application software. Generally, the second SSBL software module comprises a light operating system in order to offer greater functionalities than the FSBL while remaining compact in terms of size. The RNVM memory 12 next comprises a plurality of N memory areas $ZMA_1$ to $ZMA_N$ each comprising a content $LA_1$ to $LA_N$ such as application firmware, N being an integer greater than or equal to 2. In a particular embodiment, $LA_1$ to $LA_N$ are identical or different versions of the same content, e.g. of the same application firmware. For example, $LA_1$ to $LA_k$ may be a version "m" of the content and $LA_{k+i}$ to $LA_N$ may be a more recent version, e.g. a version "m+1" of the same content, where k is an integer belonging to [1; N−1] and "m" is a version identifier, e.g. "m" is a positive integer defined so that, the larger "m", the more recent the version of the content. In one embodiment, the content is application firmware that is based on a Linux operating system (e.g. Kernel, RootFS). In other embodiments, the content comprises one or more modules of the application firmware. This is because it may be a case of updating only part of the application firmware via receiving a new module, it may also be a case of a module associated with a new component added to the device (for example a mass memory such as a hard disk). In a variant, the content is low-level software such as firmware or a firmware part, for example the driver of a Wi-Fi chipset. In another variant, the content is maintenance software for updating certain parameters of the electronic device that cannot be modified by the application firmware. Optionally, the RNVM memory 12 may comprise other memory areas such as for example a BAL memory area storing data that have to be exchanged between the content stored in the memory areas $ZMA_1$ to $ZMA_N$ and the SSBL.

In order to detect any modification of the RNVM memory 12 by an unauthorised third party, booting using a trust chain is implemented. For this purpose, checksums are used for authenticating various modules (FSBL, SSBL and $LA_i$, i∈[1:N]). In one embodiment, the FSBL is authenticated by a secure initial boot of the component 10. In the case where the authentication succeeds, the FSBL boots up. Next, the FSBL authenticates the SSBL. In the case where the authentication succeeds, the SSBL boots up. It will in its turn authenticate the content stored in each memory area $ZMA_1$ to $ZMA_N$.

FIG. 4 illustrates a method for locking a rewritable non-volatile memory 12 of an electronic device 1 according to a particular embodiment. The method is described for N=2. However, the same method can apply to N>2. The method in FIG. 4 is described in the particular case where the memory areas $ZMA_i$, i∈[1: N] contain application firmware. However, the method can be extended and can apply to other types of content, e.g. in particular to other types of internal firmware. The electronic device 1 boots up following for example the powering-up thereof or reboots, e.g. following a firmware update. In a step S10, the processor 101 performs a first step of initialising the electronic device 1. This device generally comprises the initiation of booting software. In a particular embodiment, the booting software uses a trust chain.

In the step S12, the processor 101 selects at least one memory area from the memory areas containing the application firmware, i.e. from $ZMA_1$ and $ZMA_2$, in order to be protected by volatile locking. In one embodiment, the version of the application firmware stored in $ZMA_1$ is compared with the version of the application firmware stored in $ZMA_2$. The memory area containing the application firmware the version of which is the most recent is selected. In the case where the two memory areas contain identical versions, the memory area the previous selection of which is the oldest is selected. More generally, in the case of M memory areas comprising the most recent version of the application firmware, M being an integer belonging to [2; N], the memory area the previous selection of which, e.g. following a booting or rebooting of the electronic device, is the oldest among the selections of said M memory areas is once again selected. Thus, if $ZMA_1$ and $ZMA_2$ both contain a version m of the application firmware, then the memory area $ZMA_2$ is selected in the case where the area $ZMA_1$ was selected the previous time and vice versa. In a variant embodiment, not shown on FIG. 4, the same memory area is always selected, e.g. $ZMA_1$. In this case, it may be necessary to copy the content of the memory area $ZMA_2$ into the memory area $ZMA_1$ before volatile locking thereof so that the most recent version of the application firmware can start up. Optionally, parameters are also updated in the memory area BAL. For example, an identifier, e.g. an address, of the memory area selected. In general, in the case of N memory areas, at least one memory area is selected at the step S12 for being protected against any modifications by volatile locking.

The method of FIG. 4 can be extended and applied to other types of content. In this case, in the step S12, the processor 101 selects at least one memory area from the memory areas $ZMA_i$ for being protected by volatile locking. In one embodiment, the versions of the content stored in the memory areas $ZMA_i$ are compared with each other. The memory area containing the content the version of which is the most recent is selected. In the case where several memory areas contain identical versions, the memory area the previous selection of which is the oldest is selected.

In a step S14, the selected memory area, referred to as the active memory area, is protected against any modification by volatile locking. For this purpose, the processor 101 sends commands via internal communication means to the RNVM memory 12, which executes them to lock the memory area selected. The commands sent depend on the manufacture of the RNVM 12. Such volatile locking can be deactivated only by powering down said memory area. In a variant embodiment, the memory area ZM2 (SSBL) and the selected memory area are protected by volatile locking against any modifications. The other memory area that has not been selected, referred to as the inactive memory area, for its part has not been protected, i.e. is not locked. Consequently this memory area is used for updating the application firmware, more generally the content, as illustrated by FIG. 6.

In a step S16, the processor 101 performs a second step of initialising the electronic device using the content stored in the selected memory area. For example, it starts up the application firmware stored in the selected memory area, i.e. the active memory area. In another embodiment, when the content comprises maintenance software, the processor 101 uses this content and starts up the maintenance software in order for example to update or modify certain parameters of the electronic device that are not accessible to the application firmware. In another example, the content corresponds to a software module and the processor 101 uses this software module for ending its initialisation. In another example, a plurality of memory areas are selected, each comprising a different software module to be used in the process of initialising the electronic device. FIG. 5 illustrates in detail the step S10 of the locking method according to a particular embodiment.

In a step S100, the FSBL is authenticated by a secure initial booting software of the component 10. More precisely, an integrity check on the data present in the memory area ZM1 is performed. This check can be performed by various means, such as calculating a checksum (e.g. using hash functions of the SHA256 type) on the data written in the memory area ZM1, i.e. on the FSBL. This checksum is next compared with a reference checksum stored for example in a header of the FSBL. This reference checksum is generally encrypted and is decrypted using a public key supplied by the secure initial booting software. In the case where the authentication succeeds, the FSBL boots up in a step S102. Otherwise the electronic device 1 stops in a step S104.

In an optional step S106, hardware maintenance of the memory area ZM2 in which the SSBL is stored is implemented before authentication of the SSBL, for example using a UBI file management system. The hardware maintenance comprises for example an error detection and where applicable a correction of errors detected using in particular error correcting codes. However, if such a correction by error correcting codes is no longer possible, e.g. because the number of errors is too great, then a copying of the content of the defective memory area by rewriting in another memory area can be done before losing all the content of the defective memory area.

In a step S108, the SSBL is authenticated by the FSBL. More precisely, an integrity check on the data present in the memory area ZM2 is performed. This check can be performed by various means, such as calculating a checksum (e.g. using hash functions of the SHA256 type) on the data written in the memory area ZM2, i.e. on the SSBL. This checksum is next compared with a reference checksum stored for example in the SSBL, in a header of the SSBL. This reference checksum is generally encrypted and is decrypted using a public key supplied by the FSBL. In the event of equality, the SSBL is authenticated. In the case where the authentication succeeds, the SSBL boots up in a step S110. Otherwise the electronic device 1 stops in the step S104.

In an optional step S112, hardware maintenance of the memory areas $ZMA_1$ and $ZMA_2$ wherein for example the application firmware is stored is implemented before authentication, for example using the UBI file management system.

The same mechanisms (error detection, error correction, copying, etc.) as those implemented at the step S106 can be implemented at the step S112.

In a step S114, the content stored in $ZMA_1$ and $ZMA_2$ is authenticated by the SSBL. More precisely, an integrity check on the data present in the memory areas $ZMA_1$ and $ZMA_2$ is performed. This check can be performed by various means, such as calculating a checksum (e.g. using hash functions of the SHA256 type) on the data written in each of the memory areas $ZMA_1$ and $ZMA_2$. The checksum calculated on the data written in ZMA1 is next compared with a first reference checksum stored in the header of LA1 and the checksum calculated on the data written in ZMA2 is next compared with a second reference checksum stored in a header of LA2. These first and second reference checksums are generally encrypted and are decrypted using public keys supplied by the SSBL.

In the case where neither $ZMA_1$ nor $ZMA_2$ contains content authenticated by the SSBL (case S114-1), an emergency procedure is implemented in a step S116. For example, a basic content such as simplified application firmware stored in a third memory area $ZMA_3$ protected permanently, e.g. by OTP, can be used by the emergency procedure. In the case where the two memory areas $ZMA_1$ and $ZMA_2$ contain content $LA_1$ (respectively $LA_2$) which has been authenticated by the SSBL (case S114-2), the method continues at the step S12. In the case where only one of the two memory areas $ZMA_1$ or $ZMA_2$ contains content that has been authenticated by the SSBL (case S114-2), the content that has been authenticated by the SSBL is copied in a step S118 into the memory area wherein the non-authenticated content is stored. For example, if the content $LA_1$ stored in $ZMA_1$ is authenticated by the SSBL whereas the content $LA_2$ stored in $ZMA_2$ is not, the content of the memory area $ZMA_1$ is copied into $ZMA_2$ and vice versa in the case where the content $LA_1$ stored in $ZMA_1$ is not authenticated by the SSBL whereas the content $LA_2$ stored in $ZMA_2$ is. Once the copying has been done, the method continues at the step S12.

FIG. 6 illustrates a method for updating the content, e.g. application firmware, stored in the areas $ZMA_i$ of the RMVM memory 12 according to a particular embodiment. The method of FIG. 6 is described for application firmware but can apply to other types of content requiring updating, in particular other types of firmware. This method is generally implemented as a background task while the application firmware is running.

In the case where an update is necessary (step S200), at least one inactive, i.e. not locked, memory area is selected by the processor 101 in a step S202. In the case where N=2, the memory area that has not been selected at the step S12 is the inactive memory area selected at the step S202. In the case of a plurality of inactive memory areas, at least one inactive, i.e. not locked, memory area is selected. In a variant, all the inactive areas are selected. The processor 101 can be informed by a server that a new version of the application firmware is available. In a variant embodiment, the processor 101 can regularly interrogate the server to know whether a new version is available. In both cases, the processor 101 recovers this new version from the server.

In a step S204, the processor 101 loads the new version of the application software into the inactive memory area or areas selected at the step S202 and which are therefore not protected by volatile locking. This new application firmware is loaded by the processor 101, for example from the RAM 102, via internal communication means or directly, i.e. without passing through the RAM.

In a step S206, the processor 101 performs a check to verify that the loading of the new version of the application firmware in the inactive memory area or areas selected has functioned. More precisely, an integrity check on the data present in the inactive memory area selected is made. This check can be performed by various means, such as a calculation of a checksum on the data written in the inactive memory area. This checksum is next compared with a reference checksum calculated on the data that correspond to the new application firmware as obtained by the processor 101. In a variant, the check is obtained by a complete reading and a comparison of the raw data present in the inactive memory area selected, with the data stored locally in the RAM 102 and which correspond to the new application firmware as obtained by the processor 101. In the case where the loading of the new version has not functioned correctly, the method resumes at the step S204. In the case where the loading of the new version has functioned, the method continues at the step S208. At the step S208, the updating method ends for example with a rebooting of the electronic device 1 to use the new version of the application firmware.

In a variant embodiment that is not shown in FIG. 6, the processor 101 detects on a network the availability of a new version of a content, e.g. the application firmware, stored on a server and informs the second SSBL software module thereof. Alternatively, the processor is informed by the server of the availability of a new version of a content and informs the second SSBL software module thereof. For this purpose, the BAL memory area is advantageously used for informing the SSBL of the availability of a new version of a content. The address of the server from which to recover said new version can in particular be indicated in the BAL. The SSBL is adapted for, on rebooting, recovering the address of the server in the BAL, connecting to said server, receiving this new version of the content and considering this new version in order to complete the rebooting process.

The behaviour of the electronic device 1, and more particularly of the RNVM memory 12, during an updating phase, will now be described. With reference to the diagrams of sequences in FIGS. 7 and 8, the description relates to a scenario where initially the memory area ZMA1 is active and therefore protected against all modifications by volatile locking whereas the area ZMA2 is inactive and therefore not protected against any modifications. On FIGS. 7 and 8, ZMA1 and ZMA2 initially comprise the same version m of the content, in this case of the application firmware. However, ZMA2 could comprise an older version, e.g. a version (m−1). In the example in FIG. 7, the two memory areas can be protected alternately by volatile locking whereas in FIG. 8 only the memory area ZMA1 can be protected by volatile locking.

With reference to FIG. 7, at an instant t0, an updating is performed, e.g. because a version (m+1) of the application firmware is available. Following this updating and therefore following the loading at the step S204 of the new version (m+1) of the application firmware in the inactive memory area, i.e. ZMA2, the memory area ZMA2, which is still not locked, comprises the new version m+1 of the software. The memory area ZMA1 for its part has not been modified by the updating process.

At an instant t1, a rebooting S10 of the electronic device 1 is performed following the updating. The effect of the rebooting is in particular to remove the volatile locking of the memory area ZMA1 and where applicable of ZM2. The rebooting comprises the implementation of the locking method described with reference to FIG. 5. Supposing that everything takes place correctly, i.e. in particular that the software stored in the various memory areas of RNVM 12 are authenticated, the FSBL boots up at a time t2, since the SSBL boots up at a time t3.

The memory areas ZMA1 and ZMA2 are analysed. The memory area ZMA2, which comprises a more recent version of the application firmware, is selected S12 at a time t4 and becomes the new active memory area. ZMA2 and where applicable ZM2 are then protected S14 by volatile locking at an instant t5. The new version of application firmware stored in ZMA2 starts up S16 at an instant t6.

At a next update, the new version of the application firmware will be loaded into the non-locked memory area, namely ZMA1. Thus the memory areas ZMA1 and ZMA2 are protected alternately by volatile locking. This alternation is advantageous since it affords a more even wear on the memory areas.

In the case of attack by a malevolent third party, the memory area that contains the application software cannot be modified/deleted. Moreover, a non-locked memory area is always available for an update of a new software version. This memory area can be modified or deleted by a malevolent third party. In this case, it will subsequently not be authenticated during the step S114 and any software inserted will not start up.

With reference to FIG. 8, at an instant t0, an update is performed, e.g. because a version (m+1) of the application software is available. Following this update and therefore following the loading at the step S204 of the new version (m+1) of the application firmware in the inactive memory area, i.e. ZMA2, the memory area ZMA2, which is still not locked, comprises the new version m+1 of the software. The memory area ZMA1 for its part has not been modified by the updating process.

At an instant t1, a rebooting S10 of the electronic device 1 is performed following the update. The rebooting has in particular the effect of removing the volatile locking of the memory area ZMA1 and where applicable of ZM2. The rebooting comprises the implementation of the locking method described with reference to FIG. 5. Supposing that everything occurs correctly, i.e., in particular that the software stored in the various memory areas of RNVM 12 are authenticated, the FSBL boots up at a time t2, and then the SSBL boots up at a time t3.

Since only the memory area ZMA1 can be protected by volatile locking, the memory area ZMA1 is necessarily selected S12 and the application firmware updated in ZMA2 is copied at an instant t4 into ZMA1 prior to locking thereof.

ZMA1 and where applicable ZM2 are then protected S14 by volatile locking at an instant t5. The new version of the application firmware stored in ZMA1 starts up S16 at an instant t6.

The invention claimed is:

1. A method for locking a rewritable non-volatile memory of an electronic device, the method comprising:

performing a first step of initialising the electronic device;

selecting at least one memory area of the rewritable non-volatile memory from a set of N memory areas of the rewritable non-volatile memory, each of the N memory areas comprising a version of a content, N being an integer ≥2, wherein the selecting at least one memory area comprises:

comparing the versions of the content stored in the N memory areas;

selecting a memory area comprising a most recent version of the content; and when each of M memory areas, where M is an integer belonging to [2; N], comprise the same most recent version of the content, selecting, from said M memory areas, a memory area different from a memory area identified as having been selected during a previous initialization of the electronic device, said previous initialization being associated with a booting or rebooting of the electronic device;

locking the at least one selected memory area by a locking known as volatile locking, the locking being deactivated only by powering down the at least one selected memory area;

wherein at least one non-selected memory area of the N memory areas remains unlocked and is configured for receiving a new version of the content for a subsequent update; and performing a second step of initialising the electronic device using a content stored in the at least one selected memory area.

2. The method according to claim 1, furthermore comprising hardware maintenance of the N memory areas before any locking of the at least one selected memory area, the hardware maintenance comprising an error detection and a correction of errors detected.

3. The method according to claim 1, wherein the performing a first step of initialising the electronic device comprises:

authenticating, by a secure initial boot, first booting software stored in a first memory area of the rewritable non-volatile memory;

starting up the first booting software;

authenticating, by the first booting software, second booting software stored in a second memory area of the rewritable non-volatile memory different from the first area;

starting up the second booting software; and authenticating, by the second booting software, for each of the N memory areas, the content.

4. The method according to claim 3, wherein locking the at least one selected memory area by volatile locking furthermore comprises locking the second memory area by volatile locking.

5. The method according to claim 4, furthermore comprising hardware maintenance of the second memory area before any volatile locking of the second memory area, the hardware maintenance comprising an error detection and a correction of errors detected.

6. The method according to claim 3, wherein the first memory area is a one-time programming memory.

7. The method according to claim 1, wherein the rewritable non-volatile memory area is a NAND flash memory and/or an eMMC memory.

8. The method according to claim 1, wherein the content is application firmware and the second step of initialising the electronic device comprises the starting up of the application firmware.

9. The method according to claim 1, furthermore comprising, after the performing the second step of initialising the electronic device using the content stored in the at least one selected memory area:

determining that an update is necessary;

selecting from the set of N memory areas at least one non-locked memory area;

loading a new version of the content into the at least one non-locked memory area selected;

rebooting the electronic device.

10. An electronic device comprising a rewritable non-volatile memory and at least one processor configured for:

performing a first step of initialising the electronic device;

selecting at least one memory area of the rewritable non-volatile memory from a set of N memory areas of the rewritable non-volatile memory, each of the N memory areas comprising a content, N being an integer $\geq 2$, wherein the selecting at least one memory area comprises:

comparing the versions of the content stored in the N memory areas;

selecting a memory area comprising a most recent version of the content; and when each of M memory areas, where M is an integer belonging to [2; N], comprise the same most recent version of the content, selecting, from said M memory areas, a memory area different from a memory area identified as having been selected during a previous initialization of the electronic device, said previous initialization being associated with a booting or rebooting of the electronic device, locking the at least one selected memory area by a locking, known as volatile locking, the locking being deactivated only by powering down the at least one selected memory area; and wherein at least one non-selected memory area remains unlocked and is configured for receiving a new version of the content for a subsequent update; and performing a second step of initialising the electronic device using a content stored in the at least one selected memory area.

11. A non-transitory computer-readable storage medium that stores a computer program comprising instructions for implementing the locking method according to claim 1, when the program is executed by a processor.

* * * * *